United States Patent [19]

Hoffmann

[11] Patent Number: 5,320,579
[45] Date of Patent: Jun. 14, 1994

[54] ENERGY ABSORBING DRIVESHAFT CONNECTIONS

[75] Inventor: Werner Hoffmann, Siegburg, Fed. Rep. of Germany

[73] Assignee: GKN Automotive AG, Siegburg

[21] Appl. No.: 925,908

[22] Filed: Aug. 5, 1992

Related U.S. Application Data

[63] Continuation of Ser. No. 714,233, Jun. 12, 1991, abandoned.

[30] Foreign Application Priority Data

Jun. 23, 1990 [DE] Fed. Rep. of Germany ....... 4020088
Jun. 23, 1990 [DE] Fed. Rep. of Germany ....... 4020091

[51] Int. Cl.$^5$ ............................................. F16C 3/00
[52] U.S. Cl. ..................................... 464/181; 464/182; 464/183
[58] Field of Search ................ 464/181, 182, 183, 901, 464/149

[56] References Cited

U.S. PATENT DOCUMENTS

| | | | |
|---|---|---|---|
| 2,380,952 | 8/1945 | Dewey | 464/183 X |
| 4,238,539 | 12/1980 | Yates et al. | 464/181 X |
| 4,238,540 | 12/1980 | Yates et al. | 464/181 X |
| 4,279,275 | 7/1981 | Stanwood et al. | 464/181 X |
| 4,451,245 | 5/1984 | Hörnig et al. | 464/181 |
| 4,605,385 | 12/1986 | Pück et al. | 464/181 |
| 4,664,644 | 5/1987 | Kumata et al. | 464/181 X |
| 4,722,717 | 2/1988 | Salzman et al. | 464/181 |
| 4,932,924 | 6/1990 | Löbel | 464/181 |
| 4,952,195 | 8/1990 | Traylor | 464/181 |

FOREIGN PATENT DOCUMENTS

| | | |
|---|---|---|
| 3331021 | 3/1984 | Fed. Rep. of Germany . |
| 3822637 | 1/1990 | Fed. Rep. of Germany . |
| 3822640 | 1/1990 | Fed. Rep. of Germany . |
| GB8700154 | 8/1987 | PCT Int'l Appl. . |
| 2061458 | 5/1981 | United Kingdom . |
| 2138921 | 10/1984 | United Kingdom ................ 464/181 |
| 2233425 | 1/1991 | United Kingdom . |

OTHER PUBLICATIONS

Patent Abstracts of Japan 62-273125, Nov. 1987.

Primary Examiner—Daniel P. Stodola
Assistant Examiner—Eileen A. Dunn
Attorney, Agent, or Firm—Harness, Dickey & Pierce

[57] ABSTRACT

A driveshaft using the longitudinal drive line of a motor vehicle has a tubular shaft with end portions and attachment elements which improve energy absorption in the event of a collision. The shaft is adapted to the crash characteristics of the vehicle in question with energy absorption by the shaft being provided in those cases where the energy absorption by the vehicle has reached a minimum value and after a predetermined vehicle deformation travel wherein the level of energy absorption by the tubular shaft is subject to change.

15 Claims, 3 Drawing Sheets

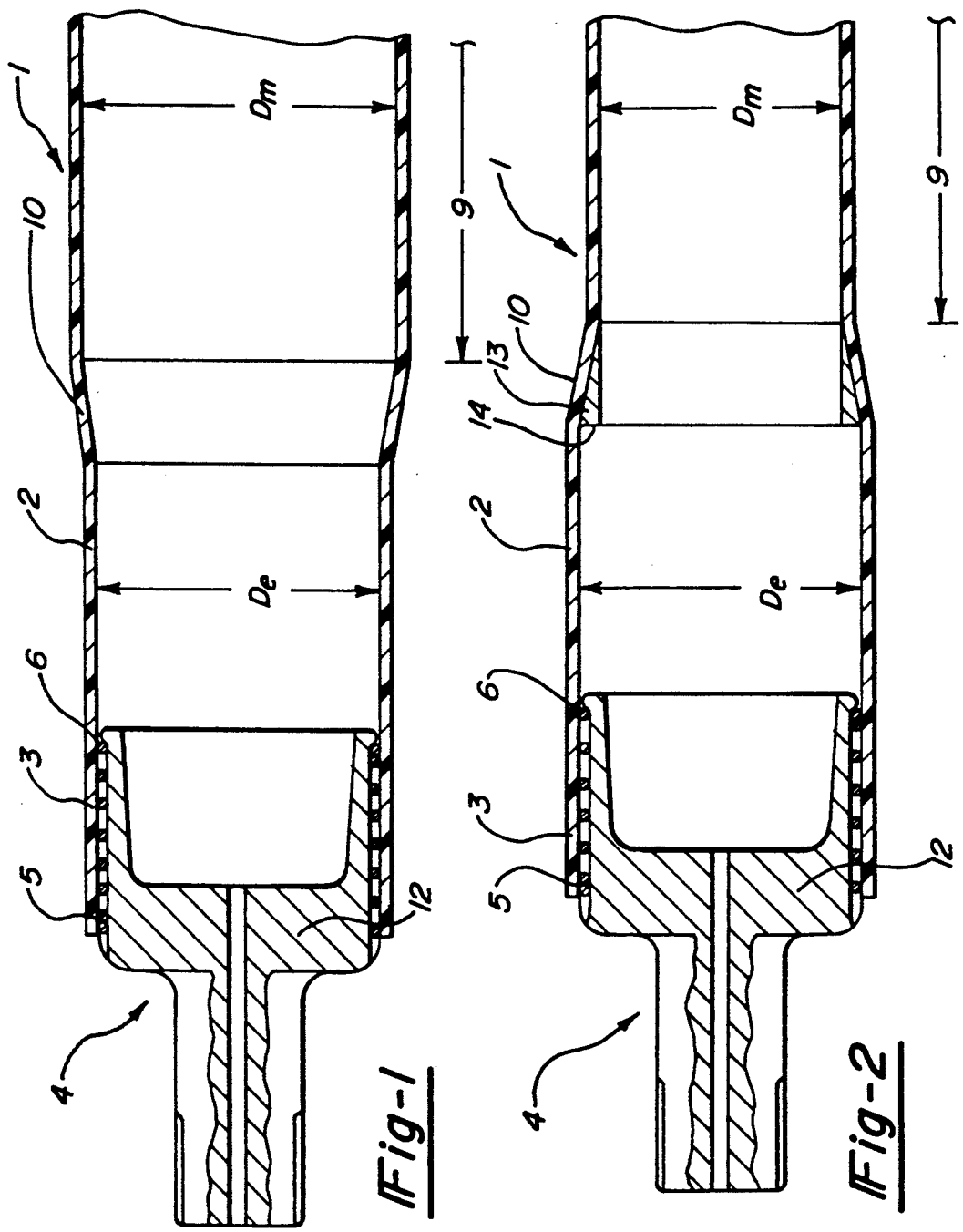

ENERGY ABSORBING DRIVESHAFT CONNECTIONS

This is a continuation of U.S. patent application Ser. No. 714,233, filed Jun. 12, 1991, now abandoned.

DESCRIPTION

The invention relates to a driveshaft for use as a propeller shaft in the driveline of a motor vehicle, especially made of a fibre composite material in the form of a tubular shaft whose ends are provided with attaching regions containing coaxially arranged attaching elements which, at least in the circumferential direction, are form-fittingly connected to the tubular shaft, with at least one of the attaching elements being slidable into the tubular shaft from a predetermined axial force onwards.

DE-PS 30 07 896 proposes a driveshaft of the said type in the case of which the tube end is slid on to a sleeve provided with external teeth which cut into the tube surface. Externally, the connection is secured by an annular member securing the assembly.

DE 38 28 018 proposes a driveshaft in the case of which, again, a metallic attaching element with external teeth is pressed into the end of a fibre composite tube, with the teeth cutting into the composite material and with the tube end being radially expanded. In the region following the pressed-in sleeve which at the same time serves as a joint part the cross-section of the fibre composite tube is reduced.

Finally, U.S. Pat. No. 4,722,717 proposes a driveshaft where, between the open end of a fibre composite shaft and an attaching sleeve, there are provided complementary longitudinal and circumferential grooves on the inner face of the tube end and on the outer face of the sleeve inserted therein, which grooves are filled with a hardenable resin which may comprise short fibre particles. When the resin has set, there is obtained a connecting element achieving a form-fitting connection in the circumferential and axial direction.

The purpose in the latter case is to produce a connection between the tube end and the attaching element which cannot only be subjected to torque, but which is also axially fixed. Because of their individual design features, the two former connections may also be subjected to high circumferential and axial loads, at least as far as pressure forces are concerned.

Furthermore, it is known to destroy the driveshaft by tearing it with suitable means, i.e. a tearing wedge, if the permissible pressure forces are exceeded. In such a case, a high amount of energy is absorbed because the fibre composite material may be provided with an increased number of radial windings to be able to withstand circumferential tensile forces.

With modern motor vehicles, the deformation behaviour in the case of a frontal collision is predetermined by design measures in such a way that certain progressive characteristic deformation curves (deformation force as a function of the deformation travel) have to be achieved. ("On achieving different characteristic deformation curves", R. Hoefs, inter alia BMFT Project TV 80 35). If the above-mentioned driveshaft is used as a propeller shaft (cardan shafts) in motor vehicles with rear wheel or four wheel drive and if a frontal collision occurs, part of the energy to be absorbed is transferred to the rear of the vehicle. In such cases, fibre composite shafts or other lightweight shafts which as a rule, because of their low weight, do not require an intermediate joint, demonstrate a very high degree of stiffness. Under the influence of vehicle deformation, the driveshaft is usually destroyed very quickly and prevents the kinetic energy from being introduced into rear of the vehicle as well as a specific energy absorption on the part of the driveshaft itself.

It is the object of the present invention to design a driveshaft of the said type for use in the longitudinal drive of a motor vehicle in such a way that in the case of a collision improved absorption of the impact energy is ensured.

In accordance with the invention it is proposed that the tubular shaft should be adapted to the crash characteristics of the vehicle concerned in respect of energy absorption in the case of a collision, with energy absorption by the tubular shaft substantially being provided in those cases where the energy absorption by the vehicle has reached a minimum value, and that after a predetermined vehicle deformation travel, the level of energy absorption by the tubular shaft should be subjected to change.

Through knowing the deformation curve of a certain vehicle type it is possible to design the driveshaft and especially the propeller shaft in such a way that energy absorption by the propeller shaft itself substantially only takes place at that point in time when the energy absorption by the vehicle has reached a minimum value. In this way it is possible to achieve a more uniform energy absorption by the entire vehicle as a result of which passenger protection with reference to the occurring delaying forces is improved. After a predetermined deformation travel determined by the energy absorption curve of the vehicle, the energy absorption of the tubular shaft itself assumes an extreme value.

In one embodiment of the invention, the tubular shaft comprises an attaching region which is connected to the inserted part of the attaching element, with the axial length of the attaching region being greater than the coaxially inserted part of the attaching element with the greatest internal diameter, and the axial pressure forces receivable by the tubular shaft in a non-destructive way are greater than the longitudinally acting adhesion and friction forces between the attaching element and the attaching region.

In order to prevent any changes in the propeller shaft connections at low impact speeds up to 5 km/h for example, the adhesion forces effective in the longitudinal direction between the tube end and the attaching sleeve my be calculated to be greater than the axial delaying forces occurring at the tubular shaft in the case of a non-destructive frontal collision of the vehicle in the area of "passenger protection" or "protection at low speeds".

By designing the driveshaft in the form of a releasable connection, produced by adhesion forces or possibly with a press-fit, between the attaching region and the attaching element, higher axial forces cause the two driveshaft parts to be separated when the adhesion forces are exceeded, with any longitudinal forces occurring under normal operating conditions being accommodated to a limited extent in order to ensure the effect of conventional plunging joints adjoining the shaft, for example.

In order to achieve non-destructive insertion of the attaching element in a further embodiment of the invention for example, the internal diameter of the central tube region is greater than the internal diameter of the attaching region.

Alternatively, it is possible for the central tube region of the tubular shaft to have a smaller internal diameter as compared to the attaching region which is provided for bending or buckling the tubular shaft.

To prevent the shaft stiffness from exerting any adverse effects at a later stage of progressive vehicle deformation, shaft bending or buckling, for example, is introduced in the region with the smaller internal diameter.

According to an embodiment of the invention, the central tube region of the tubular shaft has a smaller internal diameter as compared to the attaching region, with energy absorption being higher in the region with the smaller internal diameter.

In order to prevent radial expansion of the driveshaft in the transition region between the two different external diameters of the central tube region and the attaching region, the transition region between the two different internal diameters of the tubular shaft is designed so as to be conical.

Because the attaching region of the tubular shaft is designed with a longer axial length than the coaxially inserted part of the attaching element it is possible to slide the attaching element into The tubular shaft, so that when the adhesion forces have been overcome, the resulting friction forces become effective, as a result of which a constant energy absorption by the end region of the tubular shaft is achieved.

To prevent the attaching element and supporting ring from being slid into the central region, the internal diameter of the central tube region is smaller than the internal diameter of the attaching region so that when the attaching element rests against the stop of the supporting ring, only the central region of the tubular shaft is subject to deformation.

Unfastening of the supporting ring is prevented in that the adhesion force between the supporting ring and the conical transition region of the tubular shaft is greater than the pressure forcing occurring in the longitudinal direction.

As a result of the friction forces occurring when inserting the attaching element into the attaching region of the tubular shaft, a preferably constant energy absorption curve is achieved. Inter alia, constant energy absorption is determined by the axial length of the attaching region. This provides a simple design solution permitting the transmission of the required amount of torque in a problem-free way.

According to the first design variant, energy absorption in the transition region decreases steadily down to zero when the attaching element is slid into and through the central region of the tubular shaft. In the case of the alternative solution, energy absorption intially increases further until it decreases to zero after the tubular shaft has been bent or buckled. In both cases, a non-rotating connection between the driveshaft and attaching element no longer exists. The friction forces occurring after separation of the connection between the attaching element and the attaching region determine a constant energy absorption.

To ensure transmission of high torques under normal vehicle operating conditions, the attaching element is provided with longitudinal teeth, with the tube end comprising a cylindrical counter face form-fittingly engaging the longitudinal teeth.

In a further embodiment of the invention, a connecting element is coaxially arranged between the attaching region and the connecting element.

The said connecting element may be provided in the form of a sleeve member which itself consists of a fibre composite material or suitable plastics or a resin material and which is glued into the tube end which, in turn, is slid on to the attaching element. For fixing the tube end and attaching element it may be advantageous for the connecting element to be provided with radial, preferably axially extending apertures which permit a limited, direct gluing contact between the tube and sleeve.

However, the connecting element may also be produced in situ if there are provided suitable collar regions at the attaching element and if the attaching element or tubular member is provided with supply and ventilation apertures for introducing a glue, especially a resin mixed with short fibres.

Embodiments of the present invention are illustrated in the drawings wherein

Figure 3:
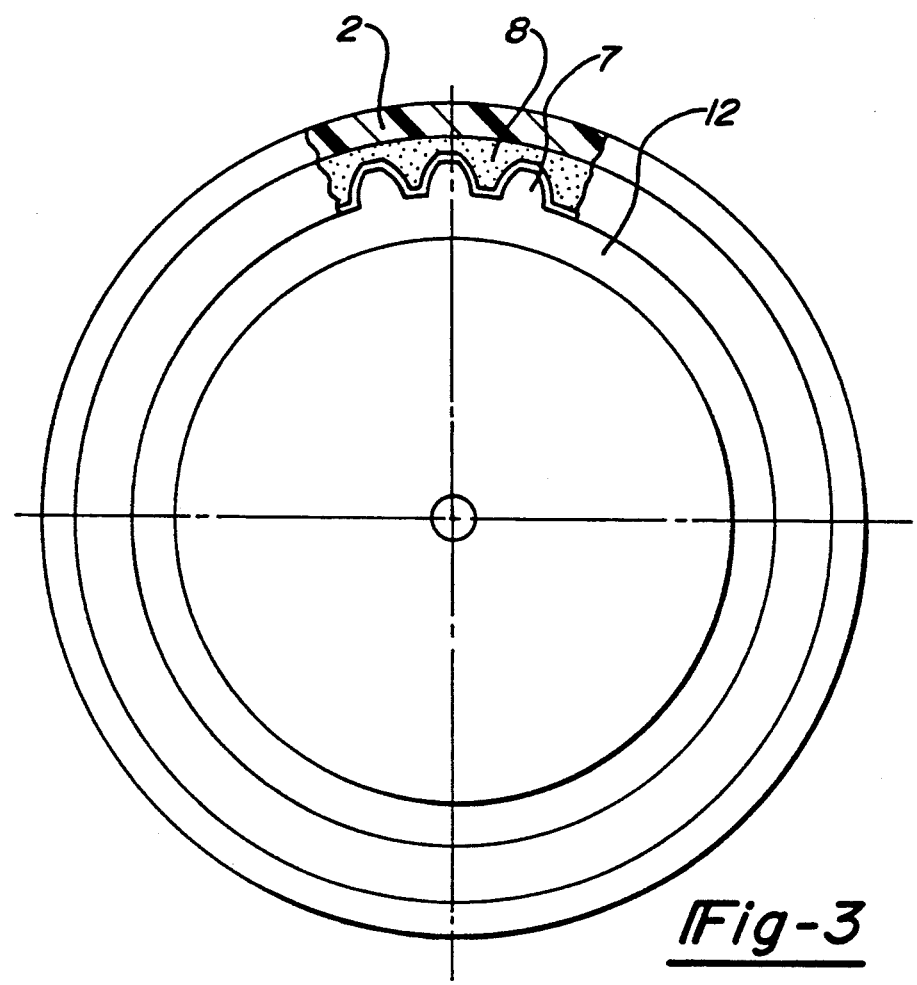
FIG. 3 shows a cross-section of a connection having an attaching element according to FIG. 1.
Figure 3A:
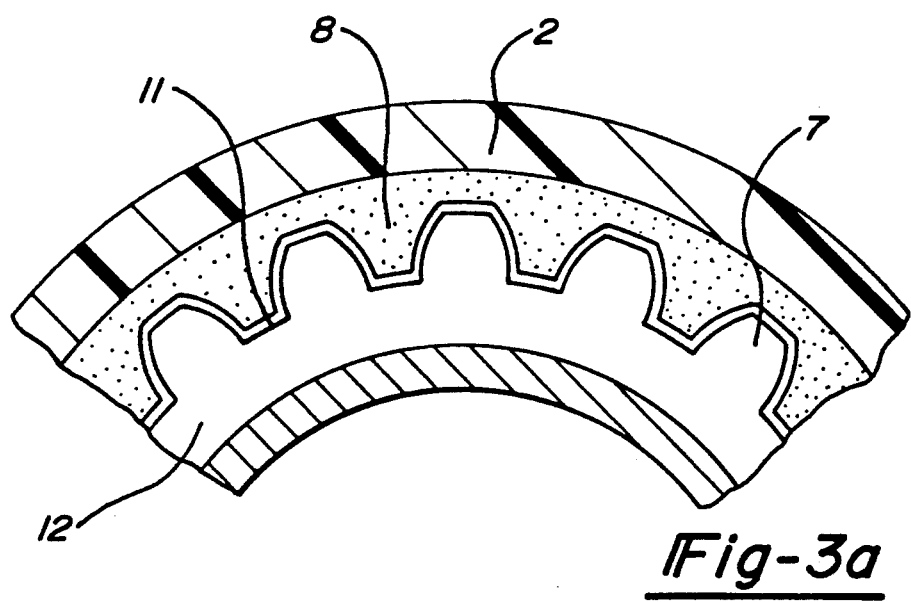
FIG. 3a is an enlarged detailed view of FIG 3.
Figure 1:
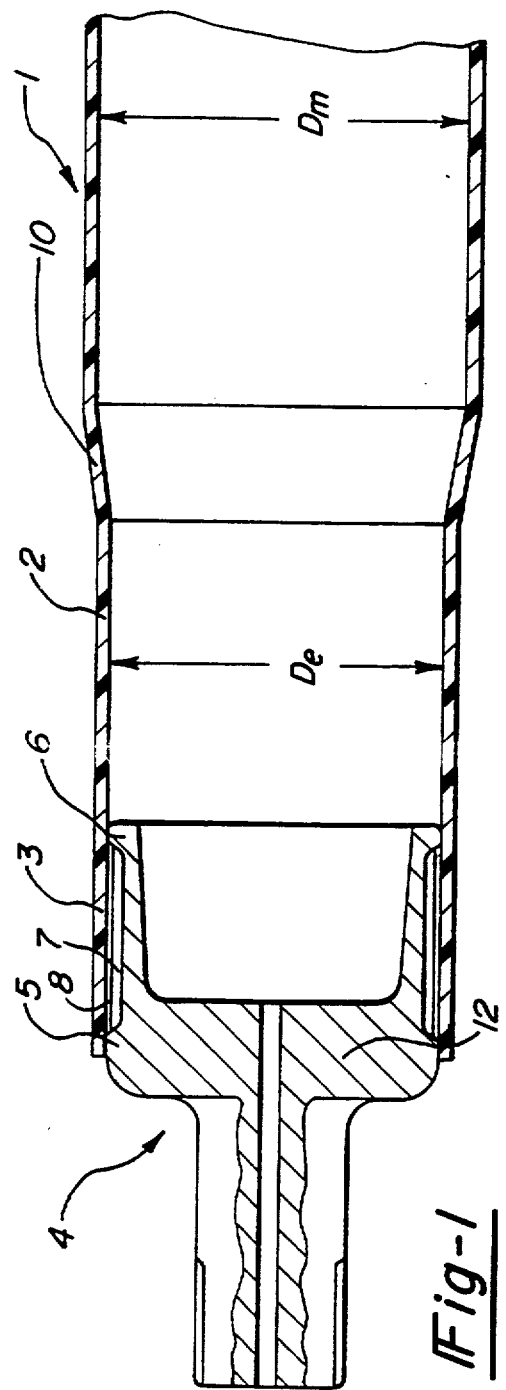
FIG. 1 is a section through a driveshaft having a first connection in accordance with the invention.

FIG. 1 shows a tube end 2 of a tubular shaft 1 which may consists of a fibre composite material for example. The tubular shaft 1, with its attaching region 3, is slid on to an attaching element 4 and may be positioned on two collar regions 5, 6 for example or one centring element of the attaching element 4. Between the two collar regions 5, 6 the attaching element 4 is provided with outer teeth 7, with a connecting element 8 form-fittingly engaging the said teeth for example, and entering an adhesion-locking connection with the internally cylindrical surface of the tube end 2, as can be seen in FIG. 3. A characteristic feature of the tubular shaft 1 is the smaller internal diameter $D_e$ of the attaching region 3 as compared to the internal diameter $D_m$ of the central region 9 of the tubular shaft, with the transition region 10 having a conical shape.

The axial length of the tubular shaft end 2 with the smaller internal diameter $D_e$ may be freely selected and permits a constant energy absorption by the tubular shaft 1 as far as the transition region 10 during the insertion process.

Figure 2:
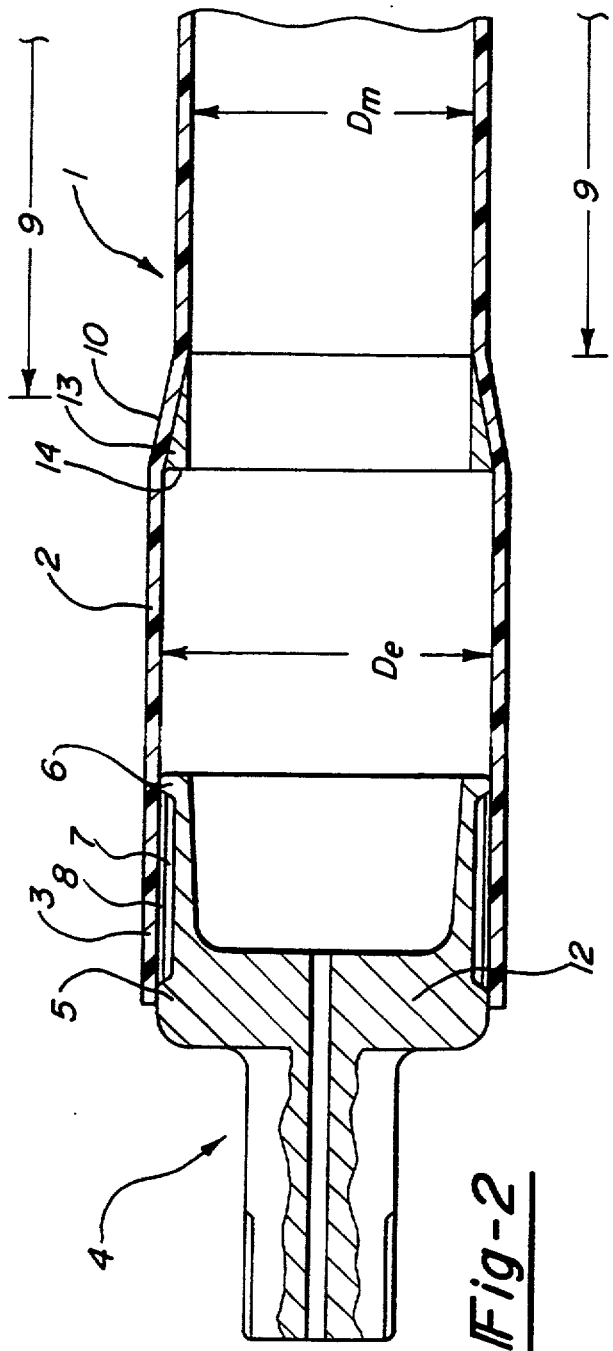
FIG. 2 is a section through a driveshaft having a further connection in accordance with the invention.
Figure 3:
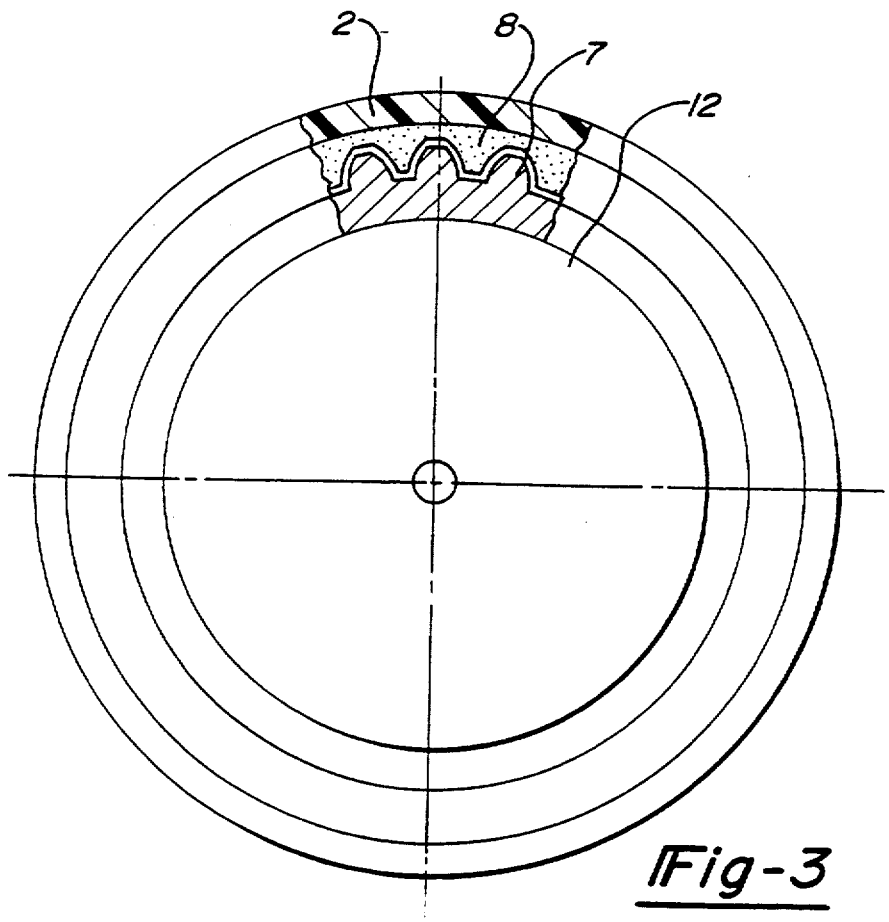
Figure 3A:
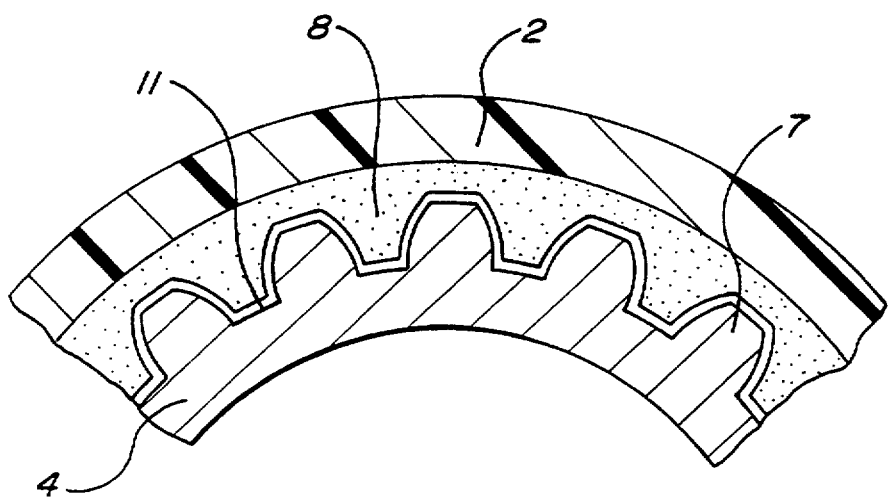

After the separation of the glued connection between the connecting element 8 and the tube end 2, energy absorption is permitted as a result of the friction forces occurring between the tube end 2, the attaching element 4 and the connecting element 8, but under certain circumstances it is possible to do without the connecting element 8. FIG. 2 shows the tube end 2 of a further embodiment of the tubular shaft 1 which may also be made of a fibre composite material for example. A characteristic feature of the tubular shaft 1 according to FIG. 2 is the greater internal diameter $D_e$ of the attaching region 3 as compared to the internal diameter $D_m$ of the central region 9 of the tubular shaft, with the transition region 10 having a conical shape. Furthermore, an internally positioned supporting ring 13 having a stop 14 is glued into the transition region 10. The adhesion forces of the glued connection are greater than the axial forces required for bending or buckling in the case of a frontal collision in order to avoid a release or destruction of the tubular shaft 1 due to tearing in the transition region.

As in the previous embodiment, the axial length of the tubular shaft end 2 with the greater internal diameter $D_e$ may be freely selected and permits a constant energy absorption by the tubular shaft 1 until the attaching element 4 rests against the stop 14 of the supporting ring 13. After the attaching element 4 has contacted the stop 14, energy absorption first continues to increase until it drops to values close to zero after the tubular shaft 1 has been bent or buckled.

FIG. 3 shows the element end 12 having teeth 7, as well as the internally cylindrical tube end 2 between which two ends there is provided the hardened glue and the connecting element 8 which consists of fibre-reinforced resin, which is connected to the tube so as to form an adhesion-locking Connection and which is separated from the teeth 7 by a separating layer 11 in such a way that only a form-fitting connection occurs.

Figure 4:
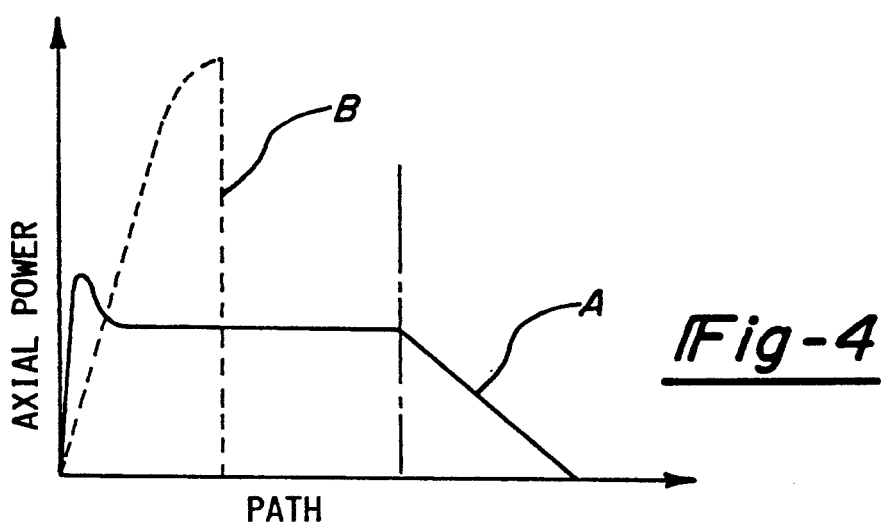
FIG. 4 is a force/travel diagram showing the energy absorption curve extending through the tubular shaft according to FIG. 1.

In FIG. 4, a force/travel diagram illustrates the energy absorption by the tubular shaft 1. Curve "A" refers to the tube end 2 to FIG. 1 in accordance with the invention and curve "B" to a tube end according to the state of the art, having two firmly clamped-in tube ends for example. In both cases, energy absorption starts with an approximately linear increase in axial force, and after the attaching element 4 has been torn off, a temporarily increased axial force according to curve "A" is accompanied by a constant energy absorption. The tubular shaft 1 in accordance with the invention is advantageous in that energy absorption by the tubular shaft 1 is constant as far as the transition region 10 and then decreases linearly in the transition region 10 until the rotatable connection between the tubular shaft 1 and the attaching element is separated as soon as the attaching element 4 is fully inserted into the central region 9 of the tubular shaft.

Figure 5:
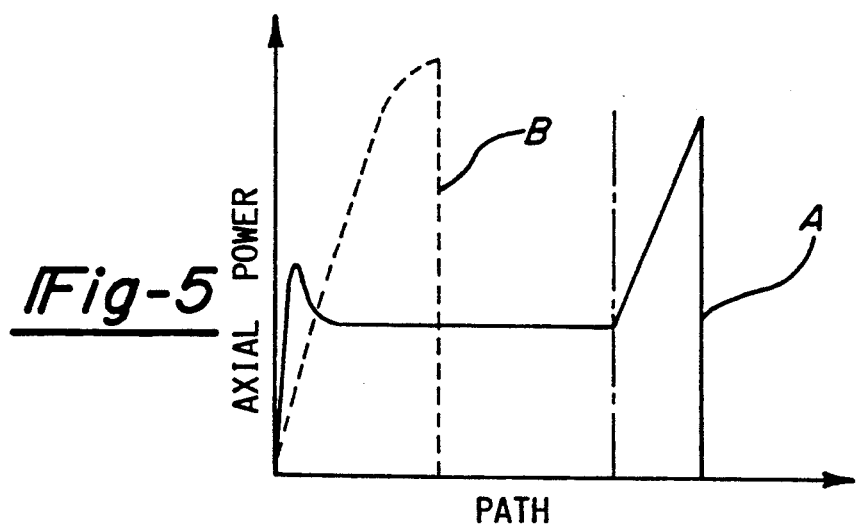
FIG. 5 is a force/travel diagram showing the energy absorption curve extending through the tubular shaft according to FIG. 2

In FIG. 5, a force/travel diagram illustrates the energy absorption by the tubular shaft 1. Curve "A" refers to the tube end 2 to FIG. 1 in accordance with the invention and curve "B" to a tube end according to the state of the art, having two firmly clamped-in tube ends for example. In both cases, energy absorption starts with an approximately linear increase in axial force, and after the attaching element 4 has been torn off, a temporarily increased axial force according to curve "A" is accompanied by a constant energy absorption. The tubular shaft 1 in accordance with the invention is advantageous in that the destruction of the tubular shaft 1 is delayed in terms of time until the attaching element 4 rests against the stop 14 of the supporting ring 13, up to the point of final destruction of the tubular shaft 1 through subsequent bending or buckling of the central tube region 9.

Figure 6:
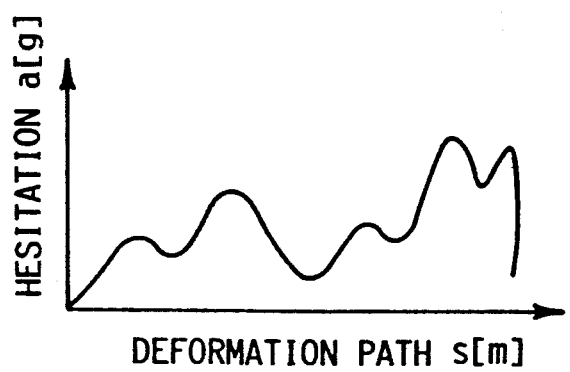
FIG. 6 shows a typical deformation curve of a vehicle involved in a collision.

FIG. 6 shows a typical deformation curve of a vehicle involved in a collision showing a negligible acceleration as a function of deformation travel. The embodiment of the tubular shaft 1 as proposed by the invention achieves an increase in energy absorption in the region of curve minima.

DRIVESHAFT

List of reference numbers 1 tubular shaft
2 tube end
3 attaching region
4 attaching element
5,6 collar region
7 Outer teeth of attaching element
8 connecting element
9 central region of tubular shaft
10 transition region
11 separating layer
12 element end
13 supporting ring
14 stop
$D_e$ internal diameter of tubular shaft end
$D_m$ internal diameter of central region of tubular shaft

I claim:

1. A driveshaft for use as a propeller shaft in the driveline of a motor vehicle comprising, a tubular shaft made of a fiber composite material, said shaft having ends for receiving attaching elements coaxially arranged in said shaft ends, said shaft having a central tube region adjacent said shaft ends with an internal diameter different from said shaft ends, said shaft ends having a desired inner diameter and a longitudinally smooth inner surface, said attaching elements at least in the circumferential direction, including teeth means for form-fittingly connecting with corresponding configurations of a connecting element in said tubular shaft ends, said connecting element coaxially arranged between said shaft end and attaching element, and an axial distance in said shaft between said attaching elements and the central tube region, at least one attaching element of said attaching elements having an outer diameter which is substantially constant over its teeth means attaching with said shaft beyond the receiving shaft end and which is shorter in length than said receiving shaft end and positioned at the end thereof with at least this one of the attaching elements being slidable into the tubular shaft from a predetermined axial force such that as said at least one attaching element slides along said axial distance between said attaching element and central tube region into said shaft end, said attaching element diameter prohibits radial expansion of said shaft end upon entrance of said attaching element within said shaft end and the tubular shaft is adapted to the crash characteristics of the vehicle concerned in respect of energy absorption in the case of a collision, with energy absorption by the tubular shaft substantially being provided in those cases where the energy absorption by the vehicle has reached a low value and that after a predetermined vehicle deformation travel, the level of energy absorption by the tubular shaft is subject to change.

2. A driveshaft according to claim 1, wherein said tubular shaft further comprises: an attaching region which receives the inserted part of the attaching element, wherein the axial length of the attaching region is greater than the coaxially inserted part of the attaching element and that the axial pressure forces non-destructively sustainable by the tubular shaft are greater than the longitudinally acting adhesion and friction forces between the attaching element and the attaching region.

3. A driveshaft according to claim 2, wherein the attaching sleeve teeth means being longitudinal teeth.

4. A driveshaft according to claim 1, wherein the central tube region internal diameter is greater as compared to the shaft end.

5. A driveshaft according to claim 4, characterised in that the transition region (10) between the two different internal diameters ($D_m$, $D_e$) of the tubular shaft (1) is designed so as to be conical.

6. A driveshaft according to claim 1, wherein the central tube region internal diameter is smaller as compared to the shaft end which is provided for bending or buckling the tubular shaft.

7. A driveshaft according to claim 6, wherein after release of the attaching element up to the point of sliding the attaching element into the transition region during the sliding-on process, in the shaft end the energy absorption curve is initially constant and that during the process of sliding the attaching element into and through the transition region, it steadily decreases to zero.

8. A driveshaft according to claim 6, wherein after releasing the attaching element up to the point where the attaching element contact the stop means during the sliding-in process, in shaft end the energy absorption curve is constant and that after contact, it initially rises further until, after the tubular shaft has been bent or buckled, energy absorption decreases to zero.

9. A driveshaft according to claim 6, characterised in that the transition region (10) between the two different internal diameters ($D_m$, $D_e$) of the tubular shaft (1) is designed so as to be conical.

10. A driveshaft according to claim 6, further comprising a transition region between the internal diameters of the central tube region and the shaft ends being internally supported by a supporting ring which is axially fixed in said transition region, said supporting ring comprising end face stop means acting versus the attaching element after being slid relative thereto with said tubular shaft.

11. A driveshaft according to claim 10, wherein the force between said stop means and said transmission region is greater than longitudinally acting buckling forces acting on the shaft.

12. A driveshaft according to claim 10, wherein after releasing the attaching element up to the point where the attaching element contacts the stop means during the sliding-in process, in the shaft end the energy absorption curve is constant and that after contact it initially rises further until, after the tubular shaft has been bent or buckled, energy absorption decreases to zero.

13. A driveshaft according to claim 1, characterised in that the tubular shaft (1) comprises a central tube region (9) whose internal diameter ($D_m$) is smaller as compared to the attaching region (3), with a higher degree of energy absorption taking place in the region with the smaller internal diameter ($D_m$).

14. A driveshaft according to claim 13, further comprising a transition region between the internal diameters of the central tube region and the attaching region being internally supported by a supporting ring which is axially fixed in said transition region, said supporting ring comprising end face stop means acting versus the attaching element after being slid relative thereto with said tubular shaft.

15. A driveshaft according to claim 1, wherein a connecting element is coaxially arranged between the shaft end and the attaching element.

* * * * *

UNITED STATES PATENT AND TRADEMARK OFFICE
CERTIFICATE OF CORRECTION

PATENT NO. : 5,320,579
DATED : June 14, 1994
INVENTOR(S) : Werner Hoffmann

It is certified that error appears in the above-indentified patent and that said Letters Patent is hereby corrected as shown below:

The title page should be deleted to appear as per attached title page.

Figures 1,2,3 and 3A should be deleted to be replaced with figures 1,2,3 and 3A as shown on the attached sheets.

United States Patent [19]
Hoffmann

[11] Patent Number: 5,320,579
[45] Date of Patent: Jun. 14, 1994

[54] ENERGY ABSORBING DRIVESHAFT CONNECTIONS

[75] Inventor: Werner Hoffmann, Siegburg, Fed. Rep. of Germany

[73] Assignee: GKN Automotive AG, Siegburg

[21] Appl. No.: 925,908

[22] Filed: Aug. 5, 1992

Related U.S. Application Data

[63] Continuation of Ser. No. 714,233, Jun. 12, 1991, abandoned.

[30] Foreign Application Priority Data

Jun. 23, 1990 [DE] Fed. Rep. of Germany ....... 4020088
Jun. 23, 1990 [DE] Fed. Rep. of Germany ....... 4020091

[51] Int. Cl.$^5$ .............................................. F16C 3/00
[52] U.S. Cl. ................... 464/181; 464/182; 464/183
[58] Field of Search ............ 464/181, 182, 183, 901, 464/149

[56] References Cited

U.S. PATENT DOCUMENTS

| 2,380,952 | 8/1945 | Dewey | 464/183 X |
| 4,238,539 | 12/1980 | Yates et al. | 464/181 X |
| 4,238,540 | 12/1980 | Yates et al. | 464/181 X |
| 4,279,275 | 7/1981 | Stanwood et al. | 464/181 X |
| 4,451,245 | 5/1984 | Hörnig et al. | 464/181 |
| 4,605,385 | 12/1986 | Pück et al. | 464/181 |
| 4,664,644 | 5/1987 | Kumata et al. | 464/181 X |
| 4,722,717 | 2/1988 | Salzman et al. | 464/181 |
| 4,932,924 | 6/1990 | Löbel | 464/181 |
| 4,952,195 | 8/1990 | Traylor | 464/181 |

FOREIGN PATENT DOCUMENTS

| 3331021 | 3/1984 | Fed. Rep. of Germany . |
| 3822637 | 1/1990 | Fed. Rep. of Germany . |
| 3822640 | 1/1990 | Fed. Rep. of Germany . |
| GB8700154 | 8/1987 | PCT Int'l Appl. . |
| 2061458 | 5/1981 | United Kingdom . |
| 2138921 | 10/1984 | United Kingdom | 464/181 |
| 2233425 | 1/1991 | United Kingdom . |

OTHER PUBLICATIONS

Patent Abstracts of Japan 62-273125, Nov. 1987.

*Primary Examiner*—Daniel P. Stodola
*Assistant Examiner*—Eileen A. Dunn
*Attorney, Agent, or Firm*—Harness, Dickey & Pierce

[57] ABSTRACT

A driveshaft using the longitudinal drive line of a motor vehicle has a tubular shaft with end portions and attachment elements which improve energy absorption in the event of a collision. The shaft is adapted to the crash characteristics of the vehicle in question with energy absorption by the shaft being provided in those cases where the energy absorption by the vehicle has reached a minimum value and after a predetermined vehicle deformation travel wherein the level of energy absorption by the tubular shaft is subject to change.

15 Claims, 3 Drawing Sheets

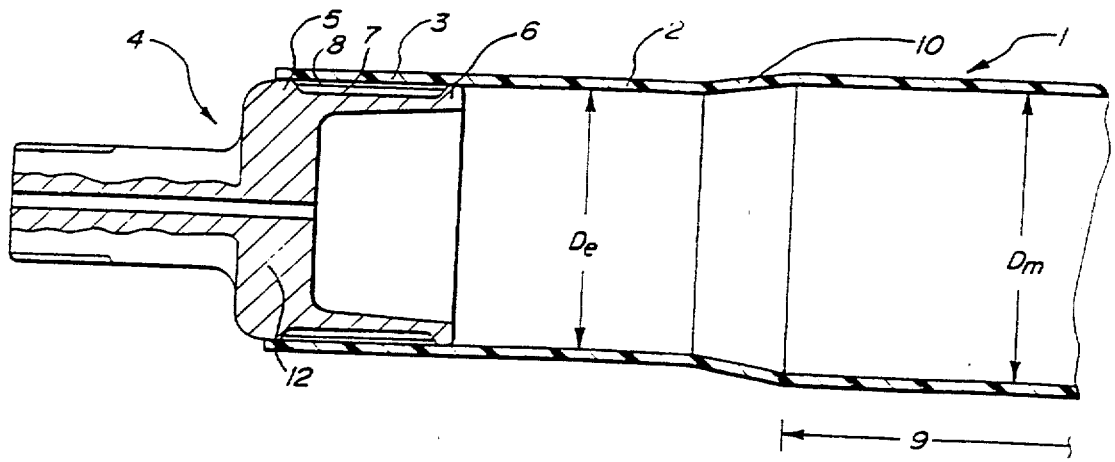

UNITED STATES PATENT AND TRADEMARK OFFICE
CERTIFICATE OF CORRECTION

PATENT NO. : 5,320,579
DATED : June 14, 1994
INVENTOR(S) : Werner Hoffmann

It is certified that error appears in the above-indentified patent and that said Letters Patent is hereby corrected as shown below:

Column 2, line 3, after "the" (second occurrence), please delete "."

Column 2, line 10, after "such", please delete "."

Column 2, line 33, after "the", please delete "."

Column 2, line 51, "my" should be --may--

Column 2, line 59, after "attaching", please delete "."

Column 3, line 26, "The" should be --the--

Column 5, line 26, "Connection" should be --connection--

Column 7, line 24, Claim 8, "contact" should be --contacts--

Column 7, line 25, Claim 8, before "shaft", please insert --the--

Signed and Sealed this

Twenty-seventh Day of June, 1995

Attest:

BRUCE LEHMAN

Attesting Officer     Commissioner of Patents and Trademarks